Patented Jan. 17, 1950

2,494,969

UNITED STATES PATENT OFFICE 2,494,969

METALLIZABLE AZO DYESTUFFS AND A PROCESS FOR THEIR MANUFACTURE

Otto Schmid, Muttenz, and Guido Schetty, Basel, Switzerland, assignors to J. R. Geigy A.-G., Basel, Switzerland, a Swiss firm No Drawing. Application January 24, 1946, Serial No. 643,196. In Switzerland January 25, 1945

9 Claims. (Cl. 260—163)

It has been found that new metallisable azo dyestuffs are obtained by diazotising compounds of the general formula

A—CO—B—NH₂ wherein A means an o-hydroxy-carboxy-aryl radical and B means an aromatic radical, whereby the radical A may also be further substituted and/or the radical B can be substituted for instance by halogen, an alkyl, carboxyl, nitro, sulfonic acid, hydroxyl, alkoxy or aryloxy group etc., and coupling the resulting diazo compound with suitable azo components. The components may advantageously be selected in such a manner that the dyestuffs will possess a sufficient solubility for the desired purpose.

The amino diaryl ketones of the present invention are obtained for instance according to the Friedel-Crafts' reaction by condensation of aromatic carboxylic acid halides containing a substituent capable to be converted into a free amino group with low alkyl esters of aromatic o-hydroxycarboxylic acids, by saponification of the resulting esters and conversion of the transformable group into the free amino group for example by reduction of a nitro group. Substituents which are not present in the reaction components, such as the sulfonic acid group, can be introduced also in an intermediate stage.

When using a diazonium compound corresponding to the above formula and carrying in o-position to the diazo group a lake-forming group, e. g. a hydroxyl, alkoxy or carboxyl group, it will be advantageous to select for the dyestuff formation such coupling components which contain in o-position to the coupling position also lake-forming groupings. Moreover, in many cases it will also be of advantage to treat the so-obtained dyestuffs in substance with metal-yielding agents instead of treating the same on the fibre, the metal-yielding agents being preferably used in such proportions that not all of the metallisable groups of the dyestuff will form a complex linkage with the metal. Some dyestuffs are also very suitable for the one-bath chroming method.

The new dyestuffs falling within the scope of the present invention are useful for the most various purposes. Partly the same are light-fast wool dyestuffs yielding pure dyeings, whose fastness properties in the moist state can be increased by an after-chroming, partly they are cellulose dyestuffs which, by a treatment with copper salts in substance or on the fibre, become faster to light and often also faster in the moist state.

Furthermore, some of the new dyestuffs constitute chrome printing dyestuffs of pure dyeing and good fastness properties in the moist state etc.

The present invention will now be illustrated, but not limited, by the following examples, wherein the parts are by weight.

Example 1

A solution of 21.4 parts of 1-(3'-aminobenzoyl)-4-hydroxybenzene-5-carboxylic acid (made from 1-(3'-nitrobenzoyl)-4-hydroxybenzene-5-carboxylic acid methyl ester according to Limprich, A. 290, 170 (1896) by alkaline saponification of the ester group and reduction of the nitro group with sodium sulfide or also with iron) in 50 parts of concentrated hydrochloric acid and 800 parts of water is diazotised at 5–8° C. with 14 parts of sodium nitrite in form of a 33% solution. The diazo compound is allowed to run under stirring into a solution of 58 parts of 1-(2'-chlorophenyl)-3-methyl-5-pyrazolone-5'-sulfonic acid in 150 parts of water treated with still 42 parts of crystallised sodium acetate and made neutral, the said solution being kept at 5–10° C. The dyestuff is then isolated after some hours by addition of sodium chloride. It constitutes, when dried, a yellow powder and dyes wool from an acid bath in pure, greenish-yellow, very even and light-fast shades. By after-chromation the fastness properties in the moist state are increased without substantially changing the shade.

Dyestuffs having similar properties are also obtained with 1-(2':5'-dichlorophenyl)-3-methyl-5-pyrazolone-4'-sulfonic acid as coupling component or with 1-(4'-aminobenzoyl)-4-hydroxybenzene-5-carboxylic acid (made from 4-nitrobenzoyl chloride and salicylic acid methyl ester according to Limprich loc. cit., alkaline saponification and reduction) and with the above coupling components.

Example 2

27.1 parts of 1-(3'-aminobenzoyl)-3-methyl-4-hydroxybenzene-5-carboxylic acid (produced from 3-nitrobenzoyl chloride and o-cresotic acid methyl ester according to Limprich, loc. cit.), upon which have been poured 50 parts of hot water and 30 parts of concentrated hydrochloric acid, are dissolved with 300 parts of hot water and diazotised at 8–10° C. with 7 parts sodium nitrite in 20 parts of water. Then the whole is mixed with a solution of 29 parts of 1-(2'-chlorophenyl)-3-methyl-5-pyrazolone-5'-sulfonic acid in form of the sodium salt and of 21 parts of crystallised sodium acetate in 100 parts of water at 10° C. When the coupling is complete, the dyestuff is salted out and isolated. It constitutes, when dried, a yellow powder and dyes wool from an acid bath in yellow shades. By after-chroming the shade is only slightly changed, but the fastness properties in the moist state are improved.

Dyestuffs with similar properties are obtained from 1-(3'-aminobenzoyl)-2-methyl-4-hydroxybenzene-5-carboxylic acid (made from m-nitrobenzoylchloride and m-cresotic acid ester) and from 1-(3'-aminobenzoyl)-5-methyl-2-hydroxybenzene-3-carboxylic acid (made from m-nitrobenzoyl chloride and p-cresotic acid ester) and from 1-(3'-amino-4'-methylbenzoyl)-4-hydroxybenzene-5-carboxylic acid (made from 3-nitro-4-methylbenzoyl chloride and salicylic acid methyl ester) and with the above coupling component. Furthermore, dyestuffs of similar properties are also produced, when using the above diazo components and 1-(2':5'-dichlorophenyl)-3-methyl-5-pyrazolone-4'-sulfonic acid.

Example 3

33.7 parts of 1-(3'-aminobenzoyl)-3-sulfo-4-hydroxybenzene-5-carboxylic acid (made from 1-(3'-nitrobenzoyl)-4-hydroxybenzene-5-carboxylic acid according Limprich, loc. cit. by sulfonation with oleum containing 5% of free $SO_3$ at 80–100° C. and by reduction of the nitro group) are dissolved as sodium salt and precipitated in the cold in a fine form by addition of 30 parts of hydrochloric acid. By a gradual addition of 7 parts of sodium nitrite in 20 parts of water at 5–10° C. the mixture is diazotised. The diazo compound is added to a solution of 21 parts of 1-(2'-chlorophenyl)-3-methyl-5-pyrazolone in 150 parts of water and 30 parts of calcined sodium carbonate. The yellow dyestuff thus formed is precipitated by addition of sodium chloride, isolated and dried. It forms a yellow powder and dyes wool from an acid bath in even, greenish-yellow shades. By after-chroming the fastness properties in the moist state are improved without causing a substantial variation of the shade.

Example 4

30.7 parts of 1-(3'-aminobenzoyl)-4-hydroxynaphthalene-3-carboxylic acid (made from m-nitrobenzoyl chloride and 1-hydroxy-2-naphthoic acid methyl ester in a known manner) are diazotised in 400 parts of water with 30 parts of hydrochloric acid and 7 parts of sodium nitrite, the yellow diazo suspension being combined at 5–10° C. with the solution of 29 parts of 1-(2'-chlorophenyl)-3-methyl-5-pyrazolone-5'-sulfonic acid (sodium salt) and 21 parts of crystallised sodium acetate in 100 parts of water. After complete coupling the dyestuff is isolated by means of sodium chloride and dried. It constitutes a yellow powder and dyes wool from an acid bath in yellow shades which become only slightly changed by after-chroming.

Example 5

25.7 parts of 1-(3'-aminobenzoyl)-4-hydroxybenzene-5-carboxylic acid in 400 parts of water and 25 parts of concentrated hydrochloric acid are diazotised at 5–8° C. with 7 parts of sodium nitrite and the diazo compound thus obtained is combined at 5–10° C. with a solution of 28.7 parts of 2-acetylamino-8-hydroxynaphthalene-6-sulfonic acid and 50 parts of sodium carbonate in 250 parts of water. After some hours the red dyestuff is precipitated by means of sodium chloride and isolated. It constitutes, when dried, a yellow red powder and dyes wool from an acid bath in pure yellow red shades, which on after-chroming are only slightly changed.

Example 6

25.7 parts of 1-(3'-aminobenzoyl)-4-hydroxybenzene-5-carboxylic acid are diazotised in the manner described in the above Example 5 and the resulting diazo compound is allowed to flow at 5–10° C. into a solution of 31 parts of 2-hydroxynaphthalene-3:6-disulfonic acid and 40 parts of sodium carbonate in 300 parts of water. After several hours the dyestuff is precipitated by means of sodium chloride and isolated. It forms, when dried, a brick-red powder and yields, on chrome-printing, on cotton orange dyeings which are well fixed and fast to light.

Similar products are obtained with 1-hydroxynaphthalene-3:6-disulfonic acid and with 2-hydroxynaphthalene-6:8-disulfonic acid. By replacing the above diazo compound by that of 1-(4'-aminobenzoyl)-4-hydroxybenzene-5-carboxylic acid and coupling the same with one of the above enumerated coupling components similar chrome-printing dyestuffs are obtained.

Example 7

25.7 parts of 1-(3'-aminobenzoyl)-4-hydroxybenzene-5-carboxylic acid are diazotised in the manner described in Example 5, the diazo compound being then combined at 5–10° C. with a solution of 36.5 parts of 1-acetylamino-8-hydroxynaphthalene-3:6-disulfonic acid and of 20 parts of concentrated ammonia in 350 parts of water. After several hours the dyestuff is precipitated by addition of sodium chloride and isolated. When dried, it constitutes a brown red powder. The new dyestuff yields, when chrome-printing on cotton, very beautiful bluish-red dyeings, which are well fixed and fast to light.

A dyestuff having similar properties will be obtained from 1-(4'-aminobenzoyl)-4-hydroxybenzene-5-carboxylic acid and 1-acetylamino-8-hydroxynaphthalene-3:6-disulfonic acid.

Example 8

33.7 parts of 1-(3'-amino-4'-sulfobenzoyl)-4-hydroxybenzene-5-carboxylic acid (made according to Limprich loc. cit. from 4-chloro-3-nitrobenzoyl chloride and salicylic acid methyl ester, saponification of the condensation product in a soda-alkaline medium, substitution of the chlorine atom by the sulfonic acid group by heating the reaction product for several hours with sodium sulfite and reduction of the nitro group by means of iron) are dissolved in 300 parts of water in form of the sodium salt, the acid being precipitated in a fine form under ice-cold conditions, by means of 30 parts of concentrated hydrochloric acid and slowly diazotised by means of 7 parts of sodium nitrite dissolved in 20 parts of water. At 5–10° C. a solution of the sodium salt of 24 parts of 2-amino-8-hydroxynaphthalene-6-sulfonic acid and of 14 parts of crystallised sodium acetate in 600 parts of water in caused to flow thereinto. The mixture is stirred for several hours at 10° C., whereupon the red dyestuff precipitated in a bronzy form is filtered by suction. The dried dyestuff, which constitutes a dark brown bronzy powder, dyes wool from an acid bath in very even yellow red shades, which, when after-chromed, scarcely will be changed, the dyeings being very light-fast and even.

Example 9

27.3 parts of 1-(4'-hydroxy-3'-aminobenzoyl)-4-hydroxy-benzene-5-carboxylic acid (made from salicylic acid methyl ester and 3-nitro-4-chloro-benzoyl chloride according to Limprich, loc. cit., saponification, substitution of the chlorine atom by the hydroxyl group by boiling the mixture for 4 hours under reflux in a mimosa-alkaline solution and reduction of the nitro group with sodium sulfide) are dissolved in 400 parts of water and 30 parts of concentrated hydrochloric acid. By a gradual addition of a solution of 7 parts of sodium nitrite in 20 parts of water there is diazotised within one hour at 0–5° C. and then the yellow, powdery diazo suspension is allowed to run into a solution of 20.6 parts of 1-acetylamino-7-hydroxynaphthalene, 13 parts of 30% sodium hydroxide solution, 25 parts of sodium carbonate and 25 parts of technical pyridine in 250 parts of ice-water. After several hours the dyestuff thus precipitated in form of a black powder is isolated. It is suspended in 1000 parts of boiling water and treated according to the method claimed in U. S. A. patent application Ser. No. 533,660, now Pat. 2,428,866, with a solution of ammonium-chromium-salicylate corresponding to 3.8 parts of chromium oxide, the whole being boiled for 10 hours under reflux. The dyestuff is precipitated from the resulting blue grey solution by addition of sodium chloride and isolated. When dried, it is a grey black powder dissolved in water with a blue grey coloration and in concentrated sulfuric acid with a blue red coloration and dyeing wool from an acid bath in grey, light-fast shades. The fastness properties of the dyeings can still be improved by an after-treatment with compounds of the hexavalent chromium without a substantial change of the shade.

Example 10

27.3 parts of 1-(4'-hydroxy-3'-aminobenzoyl)-4-hydroxy-benzene-5-carboxylic acid are diazotised in the manner indicated in Example 9. The yellow diazo suspension is allowed at 0–5° C. to run into a solution of 25 parts of 5:5'-dihydroxy-2:2'-dinaphthyl-urea-7:7'-disulfonic acid, 25 parts of calcined sodium carbonate and of 15 parts of commercial pyridine in 300 parts of water, the whole being continuously stirred. Stirring is continued at 5–10° C. for 10 hours and subsequently at room temperature for further 20 hours. Then the dyestuff precipitated in form of a dark powder is isolated. It is soluble in water with a red violet coloration and dyes cellulose from a dye-bath containing Glauber's salt in red violet shades which, by an after-treatment with cupric salts, are changed into ruby red shades of very good light-fastness and of good water-fastness.

The dyestuff containing copper and obtainable according to usual methods is soluble in water containing a little sodium carbonate with a ruby red coloration and dyes cellulose in pure, ruby red shades of very good light-fastness. The fastness properties in the moist state of such dyeings can still be improved by an after-treatment with heavy metal salts, for instance with salts of the trivalent chromium, without causing a substantial changement of the shade.

When using, instead of 5:5'-dihydroxy-2:2'-dinaphthyl-urea-7:7'-disulfonic acid, a corresponding quantity of 5:5'-dihydroxy-2:2'-dinaphthylamine-7:7'-disulfonic acid as coupling component and working in the same manner as that described above, there will be obtained a dyestuff, which dyes cellulose from a dye-bath containing Glauber's salt in blue violet shades being converted into light-fast, violet shades, when after-treated with salts of the divalent copper.

The copper-containing dyestuff dyes cellulose in violet shades of good light-fastness; by an after-treatment of such dyeings with heavy metal salts, for instance with salts of the trivalent chromium, the fastness properties in the moist state of such dyeings will still be improved without changing the shade in a substantial manner.

Example 11

14.4 parts of 1-(4'-methoxy-3'-aminobenzoyl)-4-hydroxy-benzene-5-carboxylic acid (obtainable according to Limprich, loc. cit., as described in Example 9 from 1-(4'-chloro-3'-nitrobenzoyl)-4-hydroxybenzene-5-carboxylic acid by boiling for several hours in methyl alcohol with methyl-alcoholic potassium and by reduction of the nitro group with iron according to Béchamp) are dissolved at 60° C. by means of 18 parts of concentrated hydrochloric acid and 180 parts of water, then cooled at once and diazotised at 0–5° C. by gradually adding a solution of 3.5 parts of sodium nitrite in 10 parts of water. The yellow diazo suspension is allowed to run at 5–10° C. gradually into a solution of 25.2 parts of 5:5'-dihydroxy-2:2'-dinaphthyl-urea-7:7'-disulfonic acid and of 25 parts of calcined sodium carbonate in 250 parts of water, the whole being stirred over night at this temperature. Then there is heated to 50° C. and the dyestuff precipitated with sodium chloride and isolated. The dyestuff is dissolved hot in 700 parts of water with 18 parts of sodium carbonate, cooled down and treated under stirring at 5–10° C. with an acid diazo solution from 6.9 parts of anthranilic acid in 100 parts of water, the addition of the diazo solution being made gradually. The whole is stirred for 10 hours at this temperature, whereupon the yellow red, dissolved dyestuff is precipitated by means of sodium chloride and filtered by suction. When dried, the dyestuff is a red brown powder dissolving in water with a yellow red coloration and in concentrated sulfuric acid with a ruby red coloration. It dyes cellulose from a dye-bath containing Glauber's salt in very pure, yellow red shades yielding, on after-treatment with salts of the divalent copper, bluish red dyeings of good fastness properties in the moist state and of a very good light-fastness.

21 parts of this dyestuff are dissolved in 500 parts of hot water and a solution of 5 parts of crystallised copper sulfate in 100 parts of water is gradually added thereto at 80–90° C., then stirring is continued at this temperature for further 3 hours. The whole is cooled, the brown copper compound thus precipitated is isolated and dried. The copper-containing dyestuff constitutes a brown, yellow bronzy powder, which dissolves in water with a red coloration and in concentrated sulfuric acid with a ruby red coloration. It dyes cellulose from a dye-bath containing Glauber's salt in bluish red shades of good light-fastness.

By coupling, instead of diazotised 1-(4'-methoxy-3'-aminobenzoyl)-4-hydroxybenzene-5-carboxylic acid, a corresponding quantity of diazotized 1-(4'-hydroxy-3'-aminobenzoyl)-4-hydroxybenzene-5-carboxylic acid with the same coupling component and working in the above described manner a similar dyestuff will be obtained, whose copper compound produces light-fast, bluish red dyeings on cellulose, the fastness properties in the moist state of such dyeings being improved by an after-treatment with salts of the trivalent chromium.

Example 12

27.3 parts of 1-(4'-hydroxy-3'-aminobenzoyl)-4-hydroxy-benzene-5-carboxylic acid are diazotised at 5–8° C. in 150 parts of water with 25 parts of concentrated hydrochloric acid and 7 parts of sodium nitrite. The yellow diazo compound is combined with a solution of 34.5 parts of 2-benzoylamino-5-hydroxynaphthalene-7-sulfonic acid and 20 parts of a 25% ammonia solution in 300 parts of water, to which have been added still 30 parts of technical pyridine, whereupon the whole is stirred for several hours at 5–10° C., the dyestuff is salted out with sodium chloride and filtered by suction. In a dry condition it constitutes a brown red powder.

The copper compound of the dyestuff obtainable according to usual methods which is a dark brown powder dyes fibres from regenerated cellulose from a dye-bath containing Glauber's salt in light-fast, blue red shades.

The copper-containing dyestuffs obtainable from the same diazo compound and 2-phenylamino-5-hydroxynaphthalene-7-sulfonic acid or 2-(4'-hydroxy-3'-carboxyphenylamino)-5-hydroxynaphthalene-7-sulfonic acid dye fibres from regenerated cellulose in pure, light-fast, ruby red or red violet shades respectively.

Example 13

25.7 parts of 1-(3'-aminobenzoyl)-4-hydroxybenzene-5-carboxylic acid are diazotised according to Example 1. The diazo compound treated with sodium bicarbonate until a slightly congo-acid reaction has been reached is allowed to run at 0–3° C. into a stirred solution of 26.6 parts of 1-(3'-sulfamido)-phenyl-3-methyl-5-pyrazolone and of 22 parts of anhydrous sodium carbonate in 300 parts of water, the precipitated dyestuff being isolated after some hours by filtration. Then the dyestuff is suspended in water, acidified with hydrochloric acid to a congo-blue reaction, filtered, washed with water, stirred with such a quantity of ammonia, which is required for neutralising the carboxyl group, and evaporated to dryness. The dried dyestuff, which is a loam-yellow powder, dyes wool according to the one-bath chroming method in greenish yellow, light-fast shades of very good evenness.

By replacing in the above example the 1-(3'-aminobenzoyl)-4-hydroxybenzene-5-carboxylic acid by 1-(3'-amino-4'-chlorobenzoyl)-4-hydroxy-benzene-5-carboxylic acid there will be obtained a dyestuff dyeing in reddish yellow shades and having similar properties. The 1-(3'-amino-4'-chlorobenzoyl)-4-hydroxybenzene-5-carboxylic acid can be obtained according to Limprich, loc. cit., from 4-chloro-3-nitrobenzoylchloride and salicylic acid methyl ester, saponification of the condensation product in a soda-alkaline medium and reduction of the nitro group by means of iron and hydrochloric acid.

Instead of the diazo components enumerated in the above examples it is also possible to use for instance the following ones: 1-(2'-amino-5-nitrobenzoyl)-4-hydroxybenzene-5-carboxylic acid, 1-(3'-amino-6'-acylamino- or -6'-chloro- or -6'-alkoxy-, -aryloxy- or -aralkyloxy-benzoyl)-4-hydroxy-benzene-5-carboxylic acids, 1-(3'-amino-4'-aryloxy- or -4'-aralkyl-hydroxy- or -4'-carboxymethoxy-4-hydroxybenzene-5-carboxylic acid.

Example 14

33.7 parts of 1-(3'-aminobenzoyl)-3-sulfo-4-hydroxybenzene-5-carboxylic acid are diazotised as described in Example 3. The diazo compound is added to a solution of 10 parts of 3-methyl-5-pyrazolone in 150 parts of water and 25 parts of anhydrous sodium carbonate. The yellow dyestuff thus formed is precipitated by addition of sodium chloride, isolated and dried. It forms a yellow powder and dyes wool from an acid bath in even, greenish-yellow shades. By after-chroming the fastness properties in the moist state are improved without causing a substantial variation of the shade.

A dyestuff of similar properties is obtained from 33.7 parts of 1-(3'-amino-4'-sulfobenzoyl)-4-hydroxybenzene-5-carboxylic acid diazotised as described in Example 8 and coupled with 3-methyl-5-pyrazolone.

Example 15

33.7 parts of 1-(3'-aminobenzoyl)-3-sulfo-4-hydroxybenzene-5-carboxylic acid are diazotised as described in Example 3. The diazo compound is added to a solution of 23.5 parts of 1-phenyl-3-carbethoxy-5-pyrazolone in 150 parts of water and 25 parts of anhydrous sodium carbonate. The yellow dyestuff thus formed is precipitated by addition of sodium chloride, isolated and dried. It forms a reddish-yellow powder and dyes wool from an acid bath in yellow shades. The fastness properties in the moist state are improved by after-chroming without causing a substantial changement of shade.

Dyestuffs of similar properties are obtained from diazotised 1-(3'-amino-4'-sulfobenzoyl)-4-hydroxybenzene-5-carboxylic acid and the same coupling component or 1-phenyl-5-pyrazolone-3-carboxylic acid or 1-phenyl-5-pyrazolone-3-carboxylic acid amide, whereas, on coupling 1-(3'-chlorophenyl)-5-pyrazolone-3-carboxylic acid, acid esters and acid amides thereof with the above mentioned diazo components, dyestuffs, of a somewhat greener shade are obtained.

What we claim is:

1. A metallisable monoazo dyestuff of the formula

A—CO—B—N=N—D wherein A represents a member selected from the group consisting of o-hydroxycarboxy radicals of the benzene and naphthalene series, B represents a member selected from the group consisting of m- and p-phenylene radicals, and D represents a 5-pyrazolone radical bound in the 4-position of the pyrazolone nucleus.

2. A metallisable monoazo dyestuff of the formula

A—CO—B—N=N—D wherein A represents a member selected from the group consisting of o-hydroxycarboxy radicals of the benzene and naphthalene series, B represents a member selected from the group consisting of m- and p-phenylene radicals, and D represents a 1-aryl-5-pyrazolone radical bound in the 4-position of the pyrazolone nucleus.

3. A metallisable monoazo dyestuff of the formula

A—CO—B—N=N—D wherein A represents a member selected from the group consisting of o-hydroxycarboxy radicals of the benzene and naphthalene series, B represents a member selected from the group consist- ing of m- and p-phenylene radicals, and D represents a 1-phenyl-5-pyrazolone radical bound in the 4-position of the pyrazolone nucleus.

4. A metallisable monoazo dyestuff of the formula

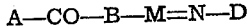

wherein A represents a member selected from the group consisting of o-hydroxycarboxy radicals of the benzene and naphthalene series, B represents a member seelcted from the group consisting of m- and p-phenylene radicals, and D represents a 1-phenyl-3-methyl-5-pyrazolone radical bound in the 4-position of the pyrazolone nucleus.

5. A metallisable monoazo dyestuff of the formula

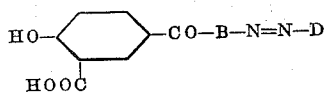

wherein B represents a member selected from the group consisting of m- and p-phenylene radicals, and D represents a 5-pyrazolone radical bound in the 4-position of the pyrazolone nucleus.

6. A metallisable monoazo dyestuff of the formula

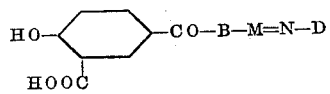

wherein B represents a member selected from the group consisting of m- and p-phenylene radicals, and D represents a 1-aryl-5-pyrazolone radical bound in the 4-position of the pyrazolone nucleus.

7. A metallisable azo dyestuff of the formula

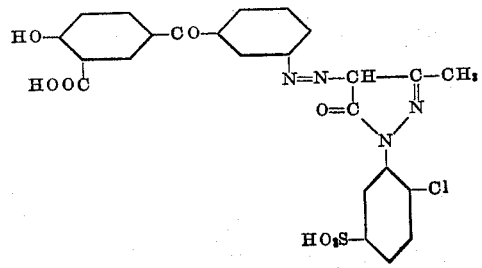

8. A metallisable azo dyestuff of the formula

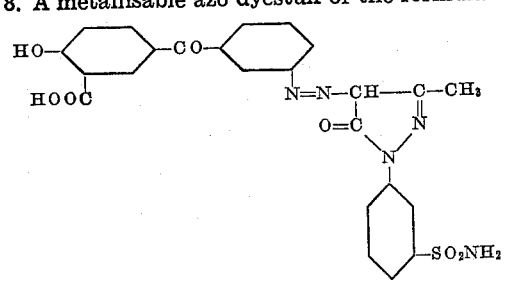

9. A metallisable azo dyestuff of the formula

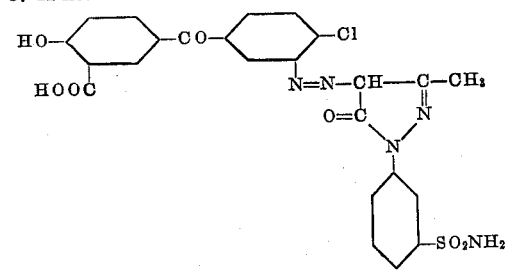

OTTO SCHMID.
GUIDO SCHETTY.

REFERENCES CITED

The following references are of record in the file of this patent:

UNITED STATES PATENTS

| Number | Name | Date |
|---|---|---|
| 1,744,172 | Laska et al. | Jan. 21, 1930 |
| 1,766,946 | Saunders | June 24, 1930 |
| 1,766,947 | Saunders | June 24, 1930 |
| 1,766,949 | Mendoza | June 24, 1930 |
| 1,917,432 | Clingestein | July 11, 1933 |
| 2,226,199 | Deckey | Dec. 24, 1940 |
| 2,232,870 | Roos | Feb. 25, 1941 |

FOREIGN PATENTS

| Number | Country | Date |
|---|---|---|
| 9,968 | Great Britain | of 1910 |